Sept. 22, 1925.

H. A. AFFEL 1,554,190

DETECTING CIRCUITS

Filed July 8, 1920     2 Sheets-Sheet 1

INVENTOR
H. A. Affel
BY
ATTORNEY

Sept. 22, 1925.

H. A. AFFEL

DETECTING CIRCUITS

Filed July 8, 1920     2 Sheets-Sheet 2

1,554,190

INVENTOR
*H. A. Affel*
BY
ATTORNEY

Patented Sept. 22, 1925.

1,554,190

UNITED STATES PATENT OFFICE.

HERMAN A. AFFEL, OF BROOKLYN, NEW YORK, ASSIGNOR TO AMERICAN TELEPHONE AND TELEGRAPH COMPANY, A CORPORATION OF NEW YORK.

DETECTING CIRCUITS.

Application filed July 8, 1920. Serial No. 394,768.

To all whom it may concern:

Be it known that I, HERMAN A. AFFEL, residing at Brooklyn, in the county of Kings and State of New York, have invented certain Improvements in Detecting Circuits, of which the following is a specification.

This invention relates to receiving apparatus and more particularly to receiving apparatus to be used in connection with transmission systems in which carrier currents are employed.

One of the objects of this invention is to provide a detector circuit having improved means for separating the carrier frequencies from the detected signaling frequencies. Another object of the invention is to provide a detector circuit having means for eliminating comparatively low interfering frequencies caused by the reaction in the detector of frequencies from a closely adjacent channel with frequencies of the channel in which the detector is included. A still further object of the invention is to provide a detecting arrangement in which the direct current component of the detected signal impulse is eliminated. These objects, as well as other objects of the invention, are obtained by means of the arrangements set forth in the following description and illustrated in the accompanying drawing, in which Figures 1, 3, 6, 8, 9, 11 and 12 are circuit diagrams of a number of different embodiments of the invention, while Figs. 2, 4, 5, 7 and 10 are curves illustrating the operation of certain of the illustrated modifications.

Figure 1:
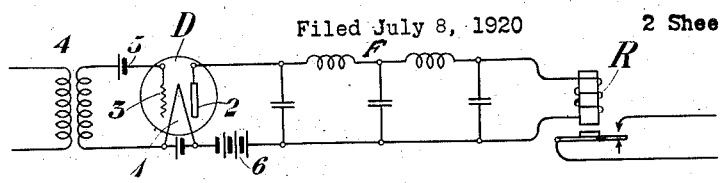

Referring to Fig. 1, D designates a vacuum tube detector comprising a filament 1, plate 2 and a controlling electrode or grid 3. The input circuit of the detector is connected between the filament 1 and the grid 3, and includes the secondary of a transformer 4 through which carrier currents modulated in accordance with the signal may be impressed upon the grid circuit. A battery or other source of potential 5 is also included in the grid circuit for adjusting the potential of the grid to any desired value. The output circuit of the detector is connected between the filament 1 and the plate 2 and includes a source of space current 6 and a receiving or recording device R. Since the circuit here described is primarily intended for receiving telegraphic signals, the receiving or recording device R is herein shown as a relay.

It is desirable in a circuit of this character to provide some means for separating the carrier frequencies from the detected signaling currents, so that only the latter actuate the receiving relay. Heretofore it has been customary to accomplish this result by shunting a condenser across the output circuit of the detector in parallel with the relay, the condenser forming a by-path for the carrier frequencies. In order however, that the condenser may effectively by-pass the carrier frequencies, it has been necessary to make its capacity so large that it tends to resonate with the inductance of the relay R at some harmonic of the fundamental dot frequency of the signal, thereby causing a distortion of the detected signaling current, which, as is well known, is made up of the dot frequency and harmonics thereof. By dot frequency is meant the frequency of a sine wave, one-half of whose cycle involves a period equal to the period during which the direct current impulse corresponding to a telegraphic dot persists.

In order to avoid this undesirable result in accordance with the present invention, a wave filter F is included in the output circuit of the detector between the detector and the receiving relay R. This wave filter is preferably of the general type illustrated and described in the U. S. Patent to George A. Campbell, No. 1,227,113, dated May 22, 1917, and is so designed as to transmit with negligible attenuation a range of frequencies of any desired width while substantially suppressing frequencies lying outside of the range. In the circuit shown in Fig. 1 the filter F is illustrated as being made up of a plurality of sections, each having a series inductance and shunt capacity. Such a filter may be caused to freely transmit frequencies from zero up to an upward limiting value while suppressing all frequencies above the preassigned upper limit. Since the fundamental dot frequency is low in ordinary telegraphic signaling, being perhaps in the neighborhood of 15 or 20 cycles per second, the limiting frequency of the filter may be made comparatively low and still permit not only the fundamental dot frequency, but a considerable number of harmonics thereof to pass through. It is desirable, of course, that the principal harmonics should be transmitted to the relay in addition to the fundamental dot frequency in order that the signal wave impressed upon the relay shall be substantially square-topped, as indicated by the curve 7 of Fig. 2.

If the upper limiting frequency of the filter is made relatively low as above indicated, it will serve not only to prevent the transmission of the carrier frequencies which appear in the output circuit of the detector, but it will also prevent the receiving relay from reacting to relatively low interfering frequencies from neighboring channels. Thus if the carrier frequency of the channel including the detecting arrangement illustrated be 5000 cycles and the carrier frequency assigned to an additional channel be 5250 cycles, a frequency of 250 cycles corresponding to the difference between these frequencies would appear in the output circuit of the detector D, if the frequency of the adjacent channel should be admitted to the detector due to imperfect selection between channels. By making the upward limiting frequency of the filter 200 cycles this interfering frequency will be eliminated, while a considerable range of harmonics of the dot frequency will pass through the filter.

It will be understood that in the operation of the detector the potential of the source 5 may be so adjusted that no current will flow between the filament and the plate when signals are not being received. The principle in accordance with which this result is possible is well understood in the art and need not be herein described. When carrier frequencies modulated in accordance with signals are impressed upon the grid of the detector the potential of the grid is varied and the impedance of the tube is changed so as to permit a space current to flow. Consequently pulses of current will flow in the output circuit and actuate the relay R, said pulses having the general wave form indicated in Fig. 7 in which pulses corresponding to a dot and a dash are illustrated.

Figure 3:
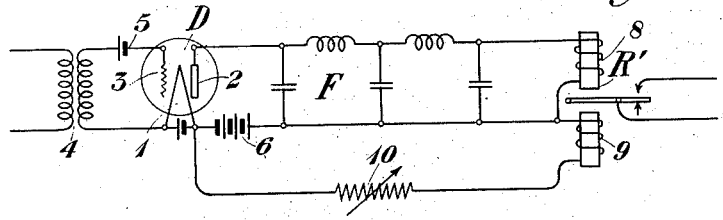

In the arrangement illustrated in Fig. 1 a neutral relay is used as the recording instrument. Fig. 3 illustrates a circuit arrangement in which a polar relay may be employed. The polar relay R' is illustrated as comprising two windings 8 and 9. One of these windings is included in the output circuit of the detector D in the same manner as the winding of the relay R in Fig. 1. The winding 9 of the polar relay is connected in circuit with the source of space current 6 of the detector D in parallel with the winding 8, a resistance 10 being included in this circuit for the purpose of adjusting the normal biasing current flowing through the winding 9.

In operation the detected signaling current is impressed upon the winding 8 in the same manner as was described in connection with the winding of the relay R in Fig. 1, and the filament F serves the same purpose as has been already described. The potential of the battery 5 in the grid circuit is adjusted as before, so that normally no current flows through the winding 8. The resistance 10 is so adjusted that the biasing current flowing through the winding 9 will have an amplitude equal to about one-half of the maximum amplitude of a detected signal pulse. The biasing current is indicated by the curve 11 of Fig. 4. If, now, the received signal impulses be assumed to be represented by the curve 7 of Fig. 4, it will be seen that during the non-signaling or no-current interval the biasing current holds the armature of the relay R' in engagement with its lower contact, but when a signaling impulse is received the pull due to the upper winding is greater than that due to the lower and the armature will have shifted to its upward position thereby closing the local circuit. The effect is therefore equivalent to passing currents of opposite polarity through the relay as indicated by the curve 12 of Fig. 5, which curve is a curve resulting from combined curves 7 and 11 of Fig. 4.

Figure 2:
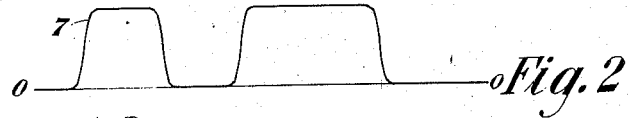
Figure 4:
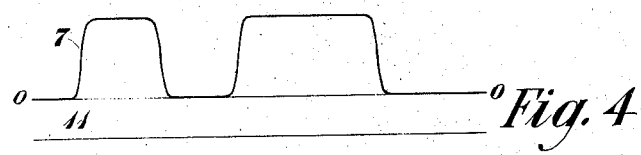
Figure 5:
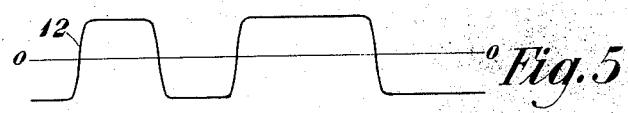

It is sometimes desirable to provide some means for eliminating the direct current component from signal pulses such as those illustrated by the curve 7 of Figs. 2 or 4.

Figure 6:
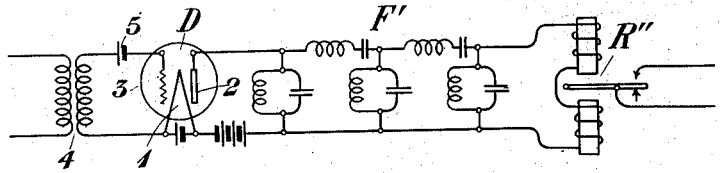
Figure 7:
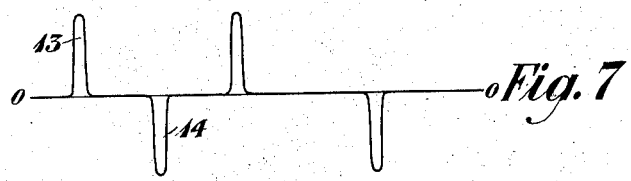
Figure 8:
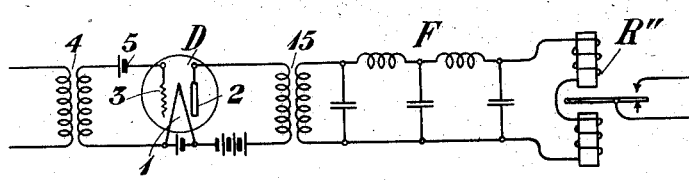
Figure 9:
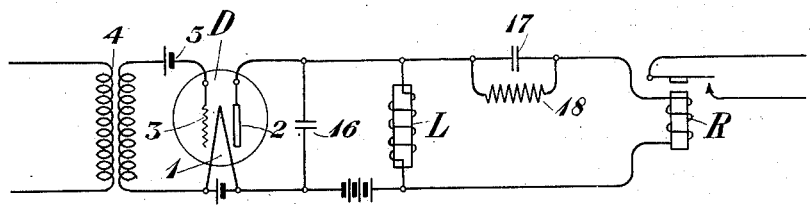
Figure 10:
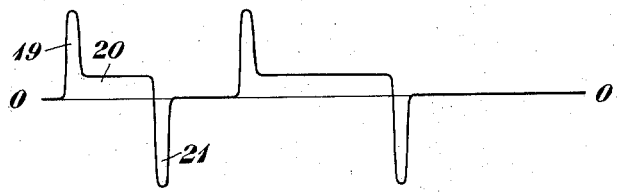

Fig. 6 illustrates an arrangement in which the filter may perform this function in addition to the functions performed in the case of the modifications illustrated in Figs. 1 and 3. In order that this additional result may be accomplished, the filter should be of one of the so-called band types disclosed in the Campbell patent above referred to. Such a band filter, as is well known, may be arranged to transmit a band frequency lying between preassigned upper and lower limiting frequencies, frequencies lying without the preassigned limits being substantially suppressed. In Fig. 6 the band filter is illustrated as consisting of a plurality of sections, each comprising a series capacity-inductance element and a shunt element formed of an inductance and capacity in parallel. By properly proportioning the inductances and capacities so that the lower limiting or cut-off frequency may be made a few cycles above zero, and the upper cut-off frequency being made the same as in the case of the filters illustrated Figs. 1 and 3, the same effect may be produced as regards the suppression of higher frequencies, while the flow of direct current is prevented since a direct current is a current of zero frequency which is below the lower limit passed by the filter. When the direct current component is suppressed from a signal wave such as is represented by the curve 7 of Fig. 2, the resultant wave is of such shape as to produce a "kick" in one direction at the beginning of the pulse, as indicated at 13 in Fig. 7, a similar "kick" of opposite polarity occurring at the end of the pulse as indicated at 14. If now the receiving relay be a polar relay, such as R" of Fig. 6, the initial "kick" of the pulse corresponding to 13 will shift the armature of the relay to its upper or marking position where it will remain during the steady state condition until at the end of the pulse the "kick" in the opposite direction shifts it back to its lower contact. Fig. 8 illustrates a modified arrangement for securing the same result as is secured by the arrangement illustrated in Fig. 6. In this case the filter is of the low pass type illustrated in Figs. 1 and 3 and is included between the detector D and the receiving relay R" for the purpose of excluding the carrier frequencies and interfering frequencies. In order to suppress the direct current component a transformer 15 is included in the output circuit of the detector, for example between the detector D and the filter F. Obviously since a direct current cannot flow through the transformer, only the two "kicks" at the beginning and end of the signal pulse will be transmitted, and the resultant wave form will be as indicated by the curve in Fig. 7. Fig. 9 illustrates an arrangement in which a neutral relay may be employed and in which a portion of the direct current component of the signal pulse may be eliminated. In accordance with this modification a condenser 16 is shunted across the output circuit of the detector D, for the purpose of by-passing the carrier frequencies, while condenser 17 of small capacity is included in series with the receiving relay R to permit the passage of the alternating components of the signaling pulse. An inductance L is also bridged across the output circuit, this inductance offering a large impedance to currents of signaling frequency by offering a path of low resistance for direct currents. With the arrangement so far described the direct current component might be entirely eliminated and a polar relay might be used as in Figs. 6 and 8. Where it is desired to use a neutral relay, however, some arrangement must be provided to hold the armature in its attracted position after the relay has received the initial "kick" of a signaling pulse. For this purpose a resistance 18 is shunted about the condenser 17 thereby permitting a small portion of the direct current component to flow through the relay R. If then we assume the signaling impulse to be of the character illustrated by the curve of Fig. 2, the resultant curve representing the forces operating in the relay R will be as represented in Fig. 10. At the beginning of the pulse the relay receives an initial "kick" 19, which causes it to attract its armature. After the cessation of the initial "kick" a constant direct current of small value, as represented at 20, continues during the steady state condition of the pulse in order to hold the armature in its attracted position. At the end of the pulse a "kick" 21 in the opposite direction assists the relay in causing the retraction of its armature.

Figure 11:
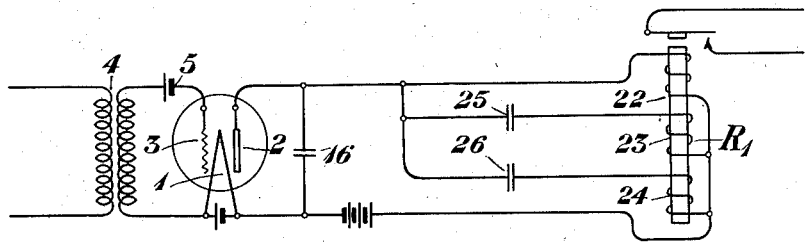
Figure 12:
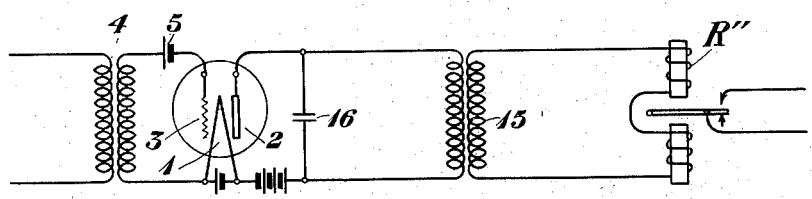

Fig. 11 illustrates a slightly modified arrangement operating on the same principle. In this case the carrier frequency is by-passed by the condenser 16 as before. The receiving relay $R_1$ in this case, however, is made up of a plurality of windings. Of these windings the upper winding 22 passes the direct current component as well as the alternating current components. This winding, however, is of such a character that the magnetic pull produced by the flow of direct current is relatively small. The remaining windings 23 and 24 have condensers 25 and 26 respectively serially included in their circuits, so that paths of low impedance are formed for the alternating current components, and the windings 23 and 24 are of such character that a large magnetic pull results from the flow of currents therethrough. As a consequence a curve, representing the resultant forces acting on the armature of the relay $R_1$, will assume a form somewhat similar to the curve illustrated in Fig. 10.

Where the necessity for preventing distortion of a signal impulse due to resonance at one of the component harmonics is not sufficiently present to warrant the expense of a filter in the output circuit of the detector, the direct current component of the signal pulse may be eliminated by the circuit shown in Fig. 12. In this circuit the carrier frequency is by-passed by means of the condenser 16, and a transformer 15 is included in the output circuit of the detector to prevent the transmission of the direct current component to the polar receiving relay R". The character of the forces acting on the polar relay R" will be similar to that illustrated by the curve in Fig. 7, except for possible distortion due to emphasizing one of the harmonics of the fundamental dot frequency.

It will be obvious that the general principles herein disclosed may be embodied in many organizations widely different from those illustrated without departing from the spirit of the invention as defined in the following claims.

What is claimed is:

1. A receiving apparatus comprising a detector, a relay energized by detected currents in the circuit of said detector, and an electrical filter between said detector and relay, said filter being so designed as to have a substantially sharp cut-off and to transmit uniformly and with substantially negligible attenuation all frequencies within a band of free transmission, while suppressing frequencies outside of said band, the limits of the band of free transmission being so set as to transmit to said relay a band of frequencies comprising the fundamental dot frequencies and harmonics thereof while suppressing frequencies above an upper limiting frequency.

2. A receiving apparatus comprising a vacuum tube detector, a relay energized by detected currents in the circuit of said detector, and a filter between said detector and said relay, said filter being so designed as to have a substantially sharp cut-off and to transmit uniformly and with substantially negligible attenuation all frequencies within a band of free transmission, while suppressing frequencies outside of said band, the limits of the band of free transmission being so set as to transmit to said relay a band of frequencies comprising the fundamental dot frequencies and harmonics thereof while suppressing frequencies above an upper limiting frequency.

3. A receiving apparatus comprising a detector, a relay energized by detected currents in the circuit of said detector, and means for preventing the transmission to said relay of the direct current component of a signal pulse and frequencies higher than the most essential harmonics of the dot frequency, said means including an electrical filter, said filter being so designed as to have a substantially sharp cut-off and to transmit uniformly and with substantially negligible attenuation all frequencies within a pre-assigned band of free transmission, while suppressing frequencies outside of said band.

4. A receiving apparatus comprising a vacuum tube detector, a relay energized by detected currents in the circuit of said detector, and means for preventing the transmission to said relay of the direct current component of a signal pulse and frequencies higher than the most essential harmonics of the dot frequency, said means including a filter, said filter being so designed as to have a substantially sharp cut-off and to transmit uniformly and with substantially negligible attenuation all frequencies within a pre-assigned band of free transmission, while suppressing frequencies outside of said band.

5. A receiving apparatus comprising a detector, a relay energized by detected currents in the circuit of said detector, a filter between said detector and said relay for suppressing frequencies higher than the band including the essential harmonics of the fundamental dot frequency of a signal pulse, said filter being so designed as to have a substantially sharp cut-off and to transmit uniformly and with substantially negligible attenuation all frequencies within a pre-assigned band of free transmission, while suppressing frequencies outside of said band, and a transformer between said detector and said relay for preventing the direct current component of a signal pulse from affecting the relay.

6. A receiving apparatus comprising a vacuum tube detector, a relay energized by detected currents in the circuit of said detector, a filter between said detector and said relay for suppressing frequencies higher than the band including the essential harmonics of the fundamental dot frequency of a signal pulse, said filter being so designed as to have a substantially sharp cut-off and to transmit uniformly and with substantially negligible attenuation all frequencies within a pre-assigned band of free transmission, while suppressing frequencies outside of said band, and a transformer between said detector and said relay for preventing the direct current component of a signal pulse from affecting the relay.

7. A receiving apparatus comprising a detector, a relay energized by detected currents in the circuit of said detector and responsive to signal pulses of unequal duration detected by said detector, and a transformer between said relay and detector for suppressing the direct current component of a signal pulse.

8. A receiving apparatus comprising a vacuum tube detector, a relay energized by detected currents in the circuit of said detector and responsive to signal pulses of unequal duration detected by said detector, and a transformer between said relay and detector for suppressing the direct current component of a signal pulse.

In testimony whereof I have signed my name to this specification this 7th day of July, 1920.

HERMAN A. AFFEL.